(12) United States Patent
Freling et al.

(10) Patent No.: US 7,785,722 B2
(45) Date of Patent: *Aug. 31, 2010

(54) CMAS RESISTANT THERMAL BARRIER COATING

(75) Inventors: Melvin Freling, West Hartford, CT (US); Kevin W. Schlichting, Storrs, CT (US); Michael J. Maloney, Marlborough, CT (US); David A. Litton, Rocky Hill, CT (US); John G. Smeggil, Simsbury, CT (US); David B. Snow, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/336,438

(22) Filed: Jan. 20, 2006

(65) Prior Publication Data

US 2007/0172703 A1 Jul. 26, 2007

(51) Int. Cl.
*B32B 9/00* (2006.01)
(52) U.S. Cl. .................. 428/701; 428/472; 428/469; 428/697; 428/699; 428/702
(58) Field of Classification Search .................. None
See application file for complete search history.

(56) References Cited

U.S. PATENT DOCUMENTS 6,025,078 A * 2/2000 Rickerby et al. ............ 428/469
6,261,643 B1 7/2001 Hasz et al.
6,875,529 B1 4/2005 Spitsberg et al.
2005/0244663 A1 * 11/2005 Ulion et al. ................. 428/472

FOREIGN PATENT DOCUMENTS

| EP | 0 992 603 A | 4/2000 |
|---|---|---|
| EP | 1 321 542 A | 6/2003 |
| EP | 1 327 704 A | 7/2003 |
| EP | 1 400 611 A | 3/2004 |
| EP | 1 591 550 A | 11/2005 |

OTHER PUBLICATIONS

Korean Office Action Dated Feb. 18, 2008, for Korean Patent Application No. 10-2006-132326.
European Search Report Dated Mar. 11, 2008, for European Patent Application No. 072505208.1.

* cited by examiner

*Primary Examiner*—Ling Xu
(74) *Attorney, Agent, or Firm*—Bachman & LaPointe, P.C.

(57) ABSTRACT

A turbine engine component is provided which has a substrate and a thermal barrier coating applied over the substrate. The thermal barrier coating comprises alternating layers of yttria-stabilized zirconia and a molten silicate resistant material. The molten silicate resistant outer layer may be formed from at least one oxide of a material selected from the group consisting of lanthanum, cerium, praseodymium, neodymium, promethium, samarium, europium, gadolinium, terbium, dysprosium, holmium, erbium, thulium, ytterbium, lutetium, scandium, indium, zirconium, hafnium, and titanium or may be formed from a gadolinia-stabilized zirconia. If desired, a metallic bond coat may be present between the substrate and the thermal barrier coating system. A method for forming the thermal barrier coating system of the present invention is described.

21 Claims, 1 Drawing Sheet

CMAS RESISTANT THERMAL BARRIER COATING

BACKGROUND OF THE INVENTION (1) Field of the Invention

The present invention relates to a thermal barrier coating having alternating layers of yttria-stabilized zirconia and a molten silicate resistant layer which can be applied to a turbine engine component, to a method for forming the coating, and to a turbine engine component having the coating.

(2) Prior Art

The degradation of turbine airfoils due to sand related distress of thermal barrier coatings is a significant concern with all turbine engines used in a desert environment. This type of distress can cause engines to be taken out of operation for significant repairs.

Sand related distress is caused by the penetration of fluid sand deposits into the thermal barrier coatings which leads to spallation and accelerated oxidation of any exposed metal.

SUMMARY OF THE INVENTION

In accordance with the present invention, there is provided a coating system which reduces sand related distress on turbine engine components. The coating system broadly comprises alternating layers of yttria-stabilized zirconia and a molten silicate resistant material.

Further in accordance with the present invention, a turbine engine component is provided which broadly comprises a substrate and alternating layers of yttria-stabilized zirconia and a molten silicate resistant material. Each layer of molten silicate resistant material may be formed from an oxide of a material selected from the group consisting of lanthanum, cerium, praseodymium, neodymium, promethium, samarium, europium, gadolinium, terbium, dysprosium, holmium, erbium, thulium, ytterbium, lutetium, scandium, indium, zirconium, hafnium, and titanium or alternatively from gadolinia-stabilized zirconia.

Still further in accordance with the present invention, a method for forming a coating system which reduces sand related distress is provided. The method broadly comprises the steps of providing a substrate, depositing alternating layers of a yttria-stabilized zirconia material and a molten silicate resistant material onto the substrate.

Other details of the CMAS resistant thermal barrier coating of the present invention, as well as other objects and advantages attendant thereto, are set forth in the following detailed description and the accompanying drawing wherein like reference numerals depict like elements.

DETAILED DESCRIPTION OF THE PREFERRED EMBODIMENT(S)

It has been discovered that certain coatings react with fluid sand deposits and a reaction product forms that inhibits fluid sand penetration into the coating. The reaction product has been identified as being a silicate oxyapatite/garnet containing primarily gadolinia, calcia, zirconia, and silica. The present invention relates to a coating system for a component, such as a turbine engine component, which takes advantage of this discovery.

Figure 1:
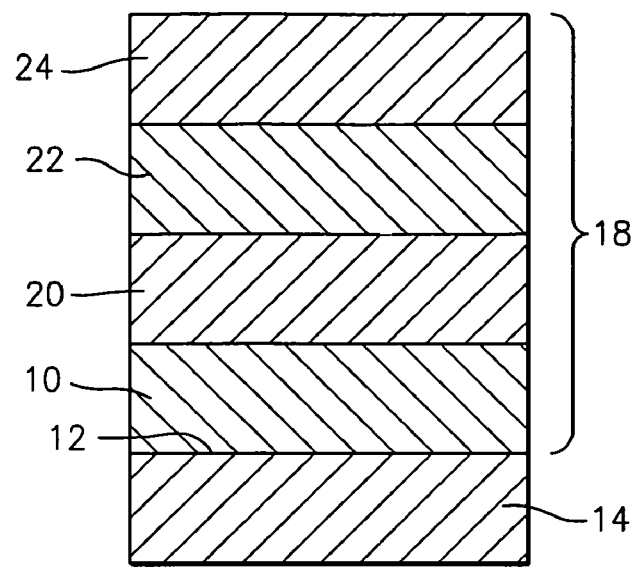
FIG. 1 is a schematic representation of a turbine engine component with the coating of the present invention.

In accordance with the present invention, referring now to FIG. 1, the coating system 18 of the present invention includes alternating layers of a yttria-stabilized zirconia and a molten silicate resistant material. In order to form the coating system 18, a first layer 10 of yttria-stabilized zirconia is applied to a surface 12 of a substrate 14, such as a turbine engine component including, but not limited to, a blade or a vane. The substrate 14 may be formed from any suitable material such as a nickel based superalloy, a cobalt based alloy, a moldybdenum based alloy, or a titanium based alloy. The yttria-stabilized zirconia layer 10 may be applied by, for example, electron beam physical vapor deposition (EB-PVD) or air plasma spray. Other methods which can be used to deposit the yttria stabilized zirconia layer 10 includes, but is not limited to, sol-gel techniques, slurry techniques, sputtering techniques, chemical vapor deposition techniques, and UV curable resin techniques. The yttria-stabilized zirconia layer will improve the erosion resistance of the system.

A preferred process for performing the deposition of the yttria-stabilized zirconia layer 10 is EB-PVD. When performing this process, the substrate 14 is placed in a coating chamber and heated to a temperature in the range of from 1700 to 2000 degrees Fahrenheit. The coating chamber may be maintained at a pressure in the range of from 0.1 to 1.0 millitorr. The feedstock feed rate may be from 0.2 to 1.5 inches/hour. The coating time may be in the range of from 20 to 120 minutes.

The deposited yttria-stabilized zirconia layer 10 may have a thickness of from 0.5 to 50 mils, preferably from 1.0 to 5.0 mils. The deposited layer 10 may have a yttria content in the range of from 4.0 to 25 wt %, preferably from 6.0 to 9.0 wt %. The deposited layer 10 may consist of yttria in the amount of 4.0 to 25 wt % and the balance zirconia. In a more preferred embodiment, the deposited layer 10 may consist of yttria in the amount of 6.0 to 9.0 wt % yttria and the balance zirconia.

After the yttria-stabilized zirconia layer 10 has been deposited, a layer 20 formed from a molten silicate resistant material may be formed over the layer 10. The layer 20 may be formed from at least one oxide of a material selected from the group consisting of lanthanum, cerium, praseodymium, neodymium, promethium, samarium, europium, gadolinium, terbium, dysprosium, holmium, erbium, thulium, ytterbium, lutetium, scandium, indium, zirconium, hafnium, and titanium. Alternatively, the layer 20 may be formed from a gadolinia-stabilized zirconia. The material(s) forming the layer 20 may be deposited using any of the deposition techniques mentioned hereinbefore. When the layer 20 is formed from a gadolinia stabilized zirconia, the layer 20 may contain from 25 to 99.9 wt % gadolinia and may have a thickness in the range of from 0.5 to 50 mils. In a preferred embodiment, gadolinia is present in an amount from 40 to 70 wt % and/or the layer 20 has a thickness in the range of from 1.0 to 5.0 mils. If desired, the layer 20 may be formed from a material consisting of from 25 to 99.9 wt % gadolinia and the balance zirconia. Still further, if desired, the layer 20 may be formed from a material consisting of from 40 to 70 wt % gadolinia and the balance zirconia.

After the layer 20 has been deposited on the layer 10, a second layer 22 of yttria-stabilized zirconia may be applied over the layer 20. The yttria-stabilized zirconia layer 22 may have any of the compositions discussed above and may be deposited using any of the techniques described herein. Thereafter, a second layer 24 of molten silicate resistant material is deposited over the yttria-stabilized zirconia. The number of layers of yttria-stabilized zirconia and a molten silicate resistant material will vary from application to application. The number of layers is a function of the target thickness for the coating and for the application.

The multi-layer coating system of the present invention may not have a defined interface between the yttria-stabilized zirconia layers and the molten silicate resistant material layer. Rather, the layers may blend together to form a gradient from yttria-stabilized zirconia rich to a gadolinia stabilized rich.

While a thickness has been provided above for each layer, it should be recognized that the layers of each material do not need to have the same thickness throughout the coating.

The layers of molten silicate resistant material of the present invention will react with molten sand deposits and form a barrier phase of oxyapatite and/or garnet to resist further penetration. The gadolinia-stabilized zirconia layer 20 will have sufficient thickness to form the desired barrier phase.

The coating system of the present invention is an advantageous thermal barrier coating system that resists the penetration of molten silicate material. The coating system provides enhanced durability in environments where sand induced distress of turbine airfoils occurs.

Figure 2:
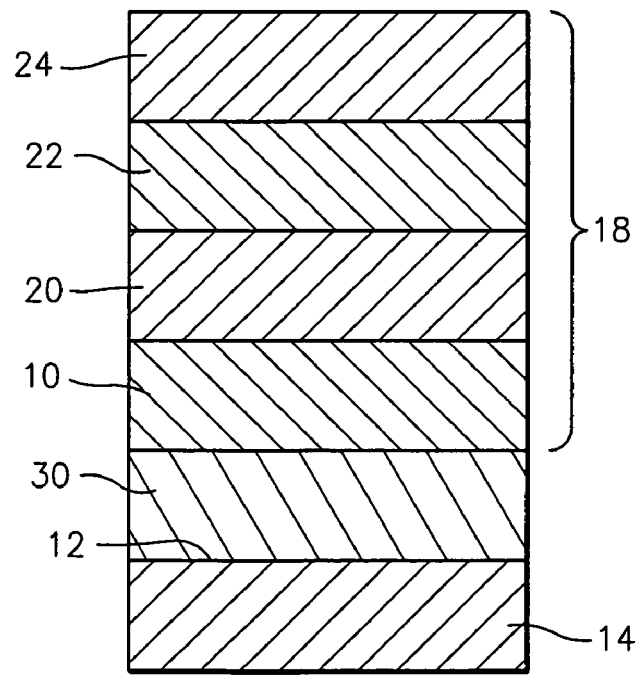
FIG. 2 is a schematic representation of a turbine engine component with an alternative coating system in accordance with the present invention.

Referring now to FIG. 2, if desired, a metallic bond coat 30 may be deposited onto the substrate 14 to bond the substrate 14 to the first layer 10 of the yttria-stabilized zirconia material. The metallic bond coat 30 may be a MCrAlY bond coat where M is at least one of nickel, cobalt, and iron. Alternatively, the metallic bond coat 30 may be an aluminide or platinum aluminide bond coat. The bond coat 30 may have a thickness in the range of from about 0.5 to 20 mils, preferably from about 0.5 to 10 mils. The bond coat 30 may be deposited by a low pressure plasma spray, HVOF (high velocity oxygen fuel), a cathodic arc process, a diffusion process, an air plasma spray process, or a plating process, as well as by any process which is capable of forming a dense uniform metallic structure.

It is apparent that there has been provided in accordance with the present invention a yttria-stabilized zirconia coating with a molten silicate resistant outer layer which fully satisfies the objects, means, and advantages set forth hereinbefore. While the present invention has been described in the context of specific embodiments, other unforeseeable alternatives, modifications, and variations may become apparent to those skilled in the art having read the foregoing description. Accordingly, it is intended to embrace those alternatives, modifications, and variations which fall within the broad scope of the appended claims.

What is claimed is:

1. A turbine engine component comprising:
    a substrate; and
    a thermal barrier coating system comprising a plurality of layers of a yttria-stabilized zirconia material and a plurality of layers of a molten silicate resistant material applied over said substrate, said layers of said yttria-stabilized zirconia material alternating with said layers of said molten silicate resistant material, and said molten silicate resistant material consisting of at least one oxide of a material selected from the group consisting of cerium, praseodymium, neodymium, promethium, samarium, europium, terbium, dysprosium, holmium, erbium, thulium, ytterbium, lutetium, scandium, indium, hafnium, and titanium.

2. The turbine engine component according to claim 1, wherein each said layer of a molten silicate resistant material has a thickness in the range of from 0.5 to 50 mils.

3. The turbine engine component according to claim 1, wherein each said layer of a molten silicate resistant material has a thickness in the range of from 1.0 to 5.0 mils.

4. The turbine engine component according to claim 1, wherein at least one layer of said yttria-stabilized zirconia layers contains from 4.0 to 25 wt % yttria.

5. The turbine engine component according to claim 1, wherein at least one layer of said yttria-stabilized zirconia layers contains from 6.0 to 9.0 wt % yttria.

6. The turbine engine component according to claim 1, wherein at least one layer of said yttria-stabilized zirconia layers consists of from 4.0 to 25 wt % yttria and the balance zirconia.

7. The turbine engine component according to claim 1, wherein at least one layer of said yttria-stabilized zirconia layers consists of from 6.0 to 9.0 wt % yttria and the balance zirconia.

8. The turbine engine component according to claim 1, wherein each said yttria-stabilized zirconia layer has a thickness in the range of from 1.0 to 50 mils.

9. The turbine engine component according to claim 1, wherein each said yttria-stabilized zirconia layer has a thickness in the range of from 1.0 to 5.0 mils.

10. The turbine engine component according to claim 1, wherein said substrate is formed from a material selected from the group consisting of a nickel based alloy, a cobalt based alloy, and a molybdenum based alloy.

11. A thermal barrier coating system comprising:
    a first layer of yttria-stabilized zirconia;
    a first layer of a molten silicate resistant material deposited over said first layer of yttria-stabilized zirconia;
    a second layer of yttria-stabilized zirconia deposited over said first layer of said molten silicate resistant material;
    a second layer of a molten silicate resistant material deposited over said second layer of yttria-stabilized zirconia; and
    said molten silicate resistant material consisting of at least one oxide of a material selected from the group consisting of cerium, praseodymium, neodymium, promethium, samarium, europium, terbium, dysprosium, holmium, erbium, thulium, ytterbium, lutetium, scandium, indium, hafnium, and titanium.

12. The thermal barrier coating system of claim 11, further comprising at least one additional layer of yttria-stabilized zirconia and at least one additional layer of said molten silicate resistant material.

13. The thermal barrier coating system according to claim 11, wherein each said layer of molten silicate resistant material has a thickness in the range of from 0.5 to 50 mils.

14. The thermal barrier coating system according to claim 11, wherein each said layer of molten silicate resistant material has a thickness in the range of from 1.0 to 5.0 mils.

15. The thermal barrier coating system according to claim 11, wherein at least one layer of said yttria-stabilized zirconia contains from 4.0 to 25 wt % yttria.

16. The thermal barrier coating system according to claim 11, wherein at least one layer of said yttria-stabilized zirconia contains from 6.0 to 9.0 wt % yttria.

17. The thermal barrier coating system according to claim 11, wherein at least one layer of said yttria-stabilized zirconia consists of from 4.0 to 25 wt % yttria and the balance zirconia.

18. The thermal barrier coating system according to claim 11, wherein at least one layer of said yttria-stabilized zirconia consists of from 6.0 to 9.0 wt % yttria and the balance zirconia.

19. The thermal barrier coating system according to claim 11, wherein each said layer of yttria-stabilized zirconia has a thickness in the range of from 0.5 to 50 mils.

20. The thermal barrier coating system according to claim 11, wherein each said layer of yttria-stabilized zirconia has a thickness in the range of from 1.0 to 5.0 mils.

21. A coating system for a component comprising alternating layers of a yttria-stabilized zirconia material and a molten silicate resistant material, and each said layer of said molten silicate resistant material having a barrier phase of at least one of oxyapatite and garnet to resist penetration of molten silicate material, and said molten silicate resistant material consisting of at least one oxide of a material selected from the group consisting of cerium, praseodymium, neodymium, promethium, samarium, europium, terbium, dysprosium, holmium, erbium, thulium, ytterbium, lutetium, scandium, indium, hafnium, and titanium.

\* \* \* \* \*